UNITED STATES PATENT OFFICE.

ERNST ULRICHS, OF REVAL, RUSSIA, ASSIGNOR TO BADISCHE ANILIN & SODA FABRIK, OF LUDWIGSHAFEN-ON-THE-RHINE, GERMANY, A CORPORATION.

AZO COLORING-MATTER.

1,077,655.

Specification of Letters Patent.

Patented Nov. 4, 1913.

No Drawing.

Application filed May 7, 1913. Serial No. 766,084.

*To all whom it may concern:*

Be it known that I, ERNST ULRICHS, citizen of the German Empire, residing at Reval, Russia, have invented new and useful Improvements in Azo Coloring-Matters, of which the following is a specification.

I have discovered that the azo coloring matter known in commerce as "lithol red R", which can be prepared by combining diazotized 2-naphthylamin-1-sulfonic acid with 2-naphthol, can be converted into an easily soluble alkali bisulfite compound, and that this compound is excellently suited for the production of color lakes. The conversion of the azo coloring matter into its bisulfite compound can be effected by heating the coloring matter with alkali bisulfite in the presence of water. The bisulfite compound can be employed for the production of lakes by treating it, either in the presence or absence of a substratum, with an alkaline earth salt and with an alkali, or with a magnesium or lead salt and alkali.

My new compound is characterized by consisting, when dry, of an orange colored powder which is easily soluble in water giving an orange-yellow solution from which, upon addition of caustic soda solution, the coloring matter naphthalene-1-sulfonic-acid-2-azo-beta-naphthol is set free in the form of its sodium salt. As this latter is much less soluble in water than is the bisulfite compound, it is generally obtained as a precipitate, unless an extremely dilute solution of the bisulfite compound is employed.

The following examples will serve to illustrate further the nature of my invention and how it can be carried into practical effect, but the invention is not confined to these examples. The parts are by weight.

Example 1: Treat 100 parts of the sodium salt, or of the free acid, of the coloring matter lithol red R with a mixture of 500 parts of 40% sodium bisulfite solution and 8,000 parts of water, while stirring and maintaining a temperature of from 80° to 90° C. When a clear solution has been obtained, precipitate the bisulfite compound by means of 1,000 parts of common salt.

Example 2: Dissolve 10 parts of the sodium bisulfite compound obtained according to the foregoing example in about 500 parts of cold water, then stir in 100 parts of barium sulfate, add a solution of 2.5 parts of crystallized barium chlorid in 25 parts of water, and finally a solution of 3.2 parts of barium hydroxid (crystallized) in 75 parts of water. The lake thus obtained is somewhat bluer than the normal barium lithol red R lake. If the formation of the lake is carried out in boiling solution, a somewhat yellower lake is produced.

Example 3: Proceed as described in the foregoing Example 2, but replace the barium chlorid and the barium hydroxid respectively by 2.5 parts of calcium chlorid and 0.8 parts of sodium hydroxid. The lake thus produced is somewhat bluer than the normal calcium lithol red R lake. In this example, the sodium hydroxid can be replaced by sodium carbonate.

Now what I claim is:—

The new compound, being a bisulfite compound of the coloring matter naphthalene-1-sulfonic-acid-2-azo-beta-naphthol, which consists, when dry, of an orange powder, is easily soluble in water, giving an orange-yellow solution, from which, on the addition of caustic soda solution, the said coloring matter naphthalene-1-sulfonic-acid-2-azo-beta-naphthol is obtained in the form of its sodium salt.

In testimony whereof I have hereunto set my hand in the presence of two subscribing witnesses.

ERNST ULRICHS.

Witnesses:
R. STROMBERG,
ERNEST BRINGENTOFF.